United States Patent
Park

(10) Patent No.: US 7,705,820 B2
(45) Date of Patent: Apr. 27, 2010

(54) LIQUID CRYSTAL DISPLAY OF LINE-ON-GLASS TYPE

(75) Inventor: Jung Sik Park, Chungju-shi (KR)

(73) Assignee: LG Display Co., Ltd., Seoul (KR)

( * ) Notice: Subject to any disclaimer, the term of this patent is extended or adjusted under 35 U.S.C. 154(b) by 909 days.

(21) Appl. No.: 10/304,704

(22) Filed: Nov. 27, 2002

(65) Prior Publication Data

US 2003/0117566 A1 Jun. 26, 2003

(30) Foreign Application Priority Data

Dec. 22, 2001 (KR) ............................ 2001-0083238

(51) Int. Cl.
  *G09G 3/36* (2006.01)
  *G09G 5/00* (2006.01)
  *G06F 3/038* (2006.01)
  *H03F 1/04* (2006.01)
  *H03F 1/34* (2006.01)
  *H03F 3/217* (2006.01)
(52) U.S. Cl. ................... 345/100; 330/207 A; 345/204; 349/149; 349/150
(58) Field of Classification Search ................... 345/52, 345/63, 211, 212, 87–104, 204; 349/149–152; 330/207 A See application file for complete search history.

(56) References Cited

U.S. PATENT DOCUMENTS

| | | | | |
|---|---|---|---|---|
| 5,657,041 A | * | 8/1997 | Choi ........................... | 345/99 |
| 5,691,787 A | * | 11/1997 | Shimada et al. ............... | 349/40 |
| 5,870,163 A | * | 2/1999 | Watanabe et al. ........... | 349/149 |
| 5,963,277 A | * | 10/1999 | Kim et al. ..................... | 349/12 |
| 6,052,171 A | * | 4/2000 | Kawaguchi ................. | 349/149 |
| 6,124,840 A | * | 9/2000 | Kwon .......................... | 345/100 |
| 6,191,828 B1 | * | 2/2001 | Kim et al. ..................... | 349/12 |
| 6,229,510 B1 | * | 5/2001 | Kim et al. ..................... | 345/87 |
| 6,567,064 B1 | * | 5/2003 | Song et al. .................... | 345/94 |
| 6,621,547 B2 | * | 9/2003 | Kang .......................... | 349/151 |
| 6,639,589 B1 | * | 10/2003 | Kim et al. ................... | 345/206 |
| 2001/0028337 A1 | * | 10/2001 | Wu et al. ..................... | 345/100 |

FOREIGN PATENT DOCUMENTS

| | | | |
|---|---|---|---|
| JP | 11338432 A | * | 12/1999 |
| KR | 2001-56509 | | 7/2001 |

\* cited by examiner

*Primary Examiner*—Alexander S. Beck
(74) *Attorney, Agent, or Firm*—McKenna Long & Aldridge LLP

(57) ABSTRACT

A line-on-glass type liquid crystal display device capable of preventing voltage differences between separate gate driver integrated circuits due to line resistances of LOG-signal line patterns includes a picture display area having a plurality of liquid crystal cells, gate driver integrated circuits for driving gate lines, line-on-glass type signal lines provided at an area outside the picture display area for applying driving signals to the gate driver integrated circuits, wherein each of the gate drive integrated circuits includes a gate input line resistor having a predetermined resistance value connected to each gate line. A resistance value of the gate input line resistors incrementally increases by a predetermined amount until a line resistance value of the line-on-glass type signal line connected between the gate driver integrated circuits is reached.

16 Claims, 5 Drawing Sheets

LIQUID CRYSTAL DISPLAY OF LINE-ON-GLASS TYPE

This application claims the benefit of Korean Patent Application No. 2001-83238, filed on Dec. 22, 2001, which is hereby incorporated by reference for all purposes as if fully set forth herein.

BACKGROUND OF THE INVENTION

1. Field of the Invention

The present invention relates to a liquid crystal displays, and more particularly to line-on-glass (LOG)-type liquid crystal displays capable of reducing signal voltage differences between gate driver integrated circuits due to line resistances of LOG-type patterns on liquid crystal display panels.

2. Description of the Related Art

Generally, liquid crystal displays (LCDs) use an electric field to control light transmittance characteristics of liquid crystal material. Accordingly, LCDs typically include a liquid crystal display panel having a plurality of liquid crystal cells arranged in a matrix pattern and a driving circuit for driving the liquid crystal cells to display a picture on the liquid crystal display panel.

The liquid crystal cells are arranged on the liquid crystal display panel at locations where gate lines are formed to cross data lines. Electric fields may be applied to the liquid crystal material by pixel and common electrodes arranged in the liquid crystal display panel. Each pixel electrode is connected to any one of data lines via source and drain electrodes of switching devices such as a thin film transistor. Gate electrodes of each thin film transistor are connected to corresponding gate lines, thereby allowing pixel voltage signals to be applied to each of the pixel electrodes of each gate line.

The driving circuit includes a gate driver for driving the gate lines, a data driver for driving the data lines, a timing controller for controlling the gate and data drivers, and a power supply for supplying driving voltages used in driving the LCD. The timing controller controls the gate and data drivers by controlling a driving timing of the gate and data drivers and applying pixel data signals to the data driver. Driving voltages generated by the power supply include common (Vcom), gate high (Vgh), gate low (Vgl) voltages, etc. The gate driver sequentially applies scanning signals to the gate lines, thereby sequentially driving the liquid crystal cells on the liquid crystal display panel one gate line at a time. The data driver applies data voltage signals to each of the data lines whenever a gate receives a gate signal. Accordingly, LCDs control light transmittance characteristics of liquid crystal material using electric fields applied between pixel and common electrodes in accordance with pixel voltage signals specific to a liquid crystal cell.

Data and gate drivers are directly connected to the liquid crystal display panel and are provided as a plurality of integrated circuits (ICs). Each of the gate driver ICs and data driver ICs are mounted to the liquid crystal display panel using tape carrier package (TCP) or chip on glass (COG) techniques. Further TCP-type gate and data driver ICs are connected to the liquid crystal display panel via a tape automated bonding (TAB) technique.

TCP-type gate and data driver ICs, connected to the liquid crystal display panel by the TAB technique, receive control signals and direct current (DC) voltage signals transmitted over signal lines provided on a printed circuit board (PCB). For example, data driver ICs are connected to each other in series, via signal lines mounted on a data PCB, receive control signals from the timing controller, and receive pixel data signals and driving voltages from the power supply. Gate driver ICs are connected to each other in series, via signal lines mounted on a gate PCB, receive control signals from the timing controller, and receive driving voltages from the power supply.

COG-type gate and data driver ICs are connected to each other via signal lines formed using a line-on-glass (LOG) technique. Mounted on a lower glass substrate of the liquid crystal display panel, the signal lines formed using the LOG technique receive control signals from the timing controller and power supply and driving voltages from the power supply.

Even when the various driver ICs are connected to liquid crystal display panels via the TAB technique, the LOG technique is typically adopted to eliminate the PCB and provide a thinner overall liquid crystal display. For example, signal lines connecting the gate driver ICs are relatively small and are provided directly on the liquid crystal display panel. Accordingly, gate driver ICs are connected to the liquid crystal display via the TAB technique, connected to each other in series via signal lines mounted on a lower glass substrate of the liquid crystal display panel, and receive control and driving voltage signals (i.e., gate driving signals).

Referring to FIG. 1, liquid crystal displays having LOG signal wiring (e.g., formed without the gate PCB) typically include a liquid crystal display-panel 1, a plurality of data TCPs 8 connected between a first side of the liquid crystal display panel 1 and a data PCB 12, a plurality of gate TCPs connected to a second side of the liquid crystal display panel 1, data driver ICs 10 mounted on the data TCPs 8, and gate driver ICs 16 mounted on the gate TCPs 14.

The liquid crystal display panel 1 includes a lower substrate 2 supporting signal lines and a thin film transistor array, an upper substrate 4 supporting a color filter array, and a layer liquid crystal material injected between the lower and upper substrates 2 and 4, respectively. The liquid crystal display panel 1 further includes a picture display area 21 having liquid crystal cells arranged where gate lines 20 and data lines 18 cross each other. The data driver ICs 10 convert digital pixel data signals into analog pixel voltage signals and apply the analog pixel voltage signals to the data lines 18.

Data pads and gate pads (not shown) are arranged at respective ends of the data and gate lines 18 and 20. The data and gate pads are arranged at an outer portion of the lower substrate 2, outside the picture display area 21. An LOG signal line group 26 is positioned within the outer area and transmits gate driving signals to the gate driver ICs 16.

Data TCPs 8 include input pads 24 and output pads 25 for electrically connecting the data driver IC 10 mounted thereon to the data PCB 12 and the data lines 18. The input pads 24 of the data TCP 8 are electrically connected to the output pads of the data PCB 12 while the output pads 25 of the data TCP 8 are electrically connected to the data pads arranged on the lower substrate 2. A first data TCP 8 is further provided with a gate driving signal transmission group 22. The gate driving signal transmission group 22 electrically connects the LOG signal line group 26 to the timing controller and power supply via the data PCB 12.

Each of the gate TCPs 14 include a gate driving signal transmission line group 28 and output pads 30 electrically connecting the gate driver ICs 16 mounted thereon to the LOG signal line group 26 and the gate lines 20, respectively. Accordingly, the output pads 30 are electrically connected to the gate pads arranged on the lower substrate 2.

Each gate driver IC 16 sequentially applies a scanning signal (e.g., a gate high voltage signal (Vgh)) to each of the gate lines 20 in response to inputted control signals. Further, the gate driver ICs 16 apply a gate low voltage signal (Vgl) to each of the gate lines 20 that do not receive the gate high voltage signal (Vgh).

The LOG signal line group 26 typically consists of signal transmission lines and transmits direct current (DC) voltage signals (e.g., gate high voltage (Vgh), gate low voltage (Vgl), common voltage (Vcom), ground voltage (GND), supply voltage (Vcc) signals, etc.) and gate control signals (e.g., gate start pulse (GSP), gate shift clock (GSC), gate enable (GOE) signals, etc.).

Referring now to FIG. 2, individual signal transmission lines within the LOG signal line group 26 are arranged in a fine parallel pattern and are provided within a narrow space, similar to a space where signal lines in gate and data pads are positioned at outer portions of the picture display area 21. Signal transmission lines within the LOG signal line group 26 are formed of same metal as the gate metal layer and are arranged on the lower substrate 2. Gate insulating and protective films 34 and 36, respectively, are disposed over the LOG signal line group 26. Signal transmission lines, which are formed from the same material as the gate metal within the LOG signal line group 26, typically have a resistivity of 0.046 and are formed simultaneously with the gate lines 20. Thus, the LOG signal line group 26 has a larger resistance than signal lines, typically made of a material such as copper, formed in the gate PCB. As resistance values of signal transmission lines within the LOG signal line group 26 are proportional to their lengths, the resistance of signal transmission lines increase as the distance from the data PCB 12 increases. Accordingly, gate driving signals, transmitted via the LOG signal line group 26, become attenuated, their voltage values become distorted, and the quality of pictures capable of being displayed on the liquid crystal display becomes deteriorated.

For example, distortion of the gate low voltage signal (Vgl) transmitted through the LOG signal line group 26 affects the picture quality displayed within the picture display area 21. Gate low voltage signals (Vgl) maintain the pixel voltage charged within the liquid crystal cell between intervals when the gate high voltage (Vgh) is charged within the pixel. Accordingly, as the gate low voltage signal is distorted, the pixel voltage within the liquid crystal cell becomes distorted.

Referring still to FIG. 2, LOG gate low voltage transmission lines VGLL, arranged within the LOG signal line group 26, supply the gate low voltage (Vgl) and include first to fourth LOG gate low voltage transmission lines VGLL 1 to VGLL 4. The first to fourth LOG gate low voltage transmission lines VGLL 1 to VGLL 4 electrically connect the first data TCP 8 and first to fourth gate TCPs 14A to 14D, respectively. The first to fourth LOG-type gate low voltage transmission lines VGLL 1 to VGLL 4 have intrinsic line resistance values a, b, c, and d, proportional to their lengths, and are connected to each other in series via the first to fourth gate TCPs 14A to 14D.

The line resistance values a, b, c, and d alter the gate low voltages (Vgl) supplied to each gate driver IC 16. For example, the first gate driver IC 16, mounted on the first gate TCP 14A, is supplied with a first gate low voltage (VGL 1). The voltage value drop of the first gate low voltage (VGL 1) is proportional to the first line resistance value of the first LOG gate low voltage transmission line (VGLL 1), a. The first gate low voltage (VGL 1) is applied to gate lines at a first horizontal line block A via the first gate driver IC 16.

The second gate driver IC 16, mounted on the second gate TCP 14B, is supplied with a second gate low voltage (VGL 2). The voltage value drop of the second gate low voltage (VGL 2) is proportional to the first and second line resistance values of the first and second LOG gate low voltage transmission lines (VGLL 1 and VGLL 2) connected to each other in series, a+b. The second gate low voltage (VGL 2) is applied to gate lines at a second horizontal line block B via the second gate driver IC 16.

The third gate driver IC 16, mounted on the third gate TCP 14C, is supplied with a third gate low voltage (VGL 3). The voltage value drop of the third gate low voltage (VGL 3) is proportional to the first, second, and third line resistance, values of the first to third LOG gate low voltage transmission lines (VGLL 1 to VGLL 3) connected to each other in series, a+b+c. The third gate low voltage (VGL 3) is applied to gate lines at a third horizontal line block C via the third gate driver IC 16.

The fourth gate driver IC 16, mounted on the fourth gate TCP 14D, is supplied with a fourth gate low voltage (VGL 4). The voltage value drop of the fourth gate low voltage (VGL 4) is proportional to the first to fourth line resistance values of the first to fourth LOG gate low voltage transmission lines (VGLL 1 to VGLL 4) connected to each other in series, a+b+c+d. The fourth gate low voltage (VGL 4) is applied to gate lines at a fourth horizontal line block D via the fourth gate driver IC 16.

As differences between the gate low voltages VGL 1 to VGL 4 applied to the gate lines via each gate driver IC 16 occur, the brightness to which images are displayed across the horizontal line blocks A to D becomes non-uniform. The non-uniform brightness across horizontal line blocks A to D induces a cross-line phenomenon (32) that divides the screen in brightness values and thereby deteriorates the picture quality of the liquid crystal display. Between the first gate driver IC 16 and the fourth gate driver IC 16, first to fourth line resistance values a, b, c, and d are added to each other. Accordingly, the first gate low voltage (VGL 1) is greater than the second gate low voltage (VGL 2), the second gate low voltage (VGL 2) is greater than the third gate low voltage (VGL 3), and the third gate low voltage (VGL 3) is greater than the fourth gate low voltage (VGL 4).

For each of the gate driver ICs 16, gate low voltage differences such as those described above can be compensated for by providing a plurality of LOG gate low voltage transmission lines independently connected to their corresponding gate driver ICs 16 and/or by enlarging the cross-sectional area of the signal transmission lines. However, these compensation solutions are difficult to satisfactorily achieve because the area in which the LOG signal line group 26 is located is not expandable and providing independently connected LOG gate low voltage transmission lines with enlarged cross-sectional areas within such small, confined spaces is difficult.

Accordingly, gate low voltage differences caused by the line resistance must be compensated for without altering the design of the LOG gate low voltage line VGLL.

SUMMARY OF THE INVENTION

Accordingly, the present invention is directed to a line-on-glass (LOG)-type liquid crystal display that substantially obviates one or more of the problems due to limitations and disadvantages of the related art.

An advantage of the present invention provides a LOG liquid crystal display wherein voltage differences between gate driver ICs, caused by a variance in line resistances of signal transmission lines within a LOG signal line group, is compensated for and a uniform brightness may be expressed across horizontal line blocks on the liquid crystal display.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a line-on-glass liquid crystal display device includes a picture display area having liquid crystal cells arranged where gate lines and data lines cross each other; gate driver integrated circuits, for driving the gate lines, mounted on gate tape carrier packages; data driver integrated circuits, for driving the data lines, mounted on data tape carrier packages; and line-on-glass (LOG) signal lines arranged at an outer portion of the picture display area via a line-on-glass technique for applying driving signals to the gate driver integrated circuits. Each of the gate driver integrated circuits may include a gate input line resistor for being connected to a gate line, wherein a resistance value of each of the gate input line resistors is different for each gate line.

In one aspect of the present invention, the resistance values of the gate input line resistors incrementally increase at each consecutive gate line, wherein the resistance value of the gate input line resistors approaches a line resistance value of the line-on-glass signal line connecting the gate driver integrated circuits.

In another aspect of the present invention, each gate input line resistor may be coupled to at least one of a gate high voltage input line and a gate low voltage input line, wherein the gate high and low voltage input lines may be commonly connected to input terminals of stages within the gate driver integrated circuits for sequentially driving the gate lines.

In yet another aspect of the present invention, resistance values of the gate input line resistors incrementally increase at each stage.

In still another aspect of the present invention, each gate input line resistor may be coupled to an output line of each of the stages.

In one aspect of the present invention, resistance values of the gate input line resistors incrementally increase at each output line.

In yet another aspect of the present invention, input line resistance values of the last gate lines connected to each of the gate driver integrated circuits may be substantially equal to input line resistance values of the first gate line connected to a successive gate driver integrated circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
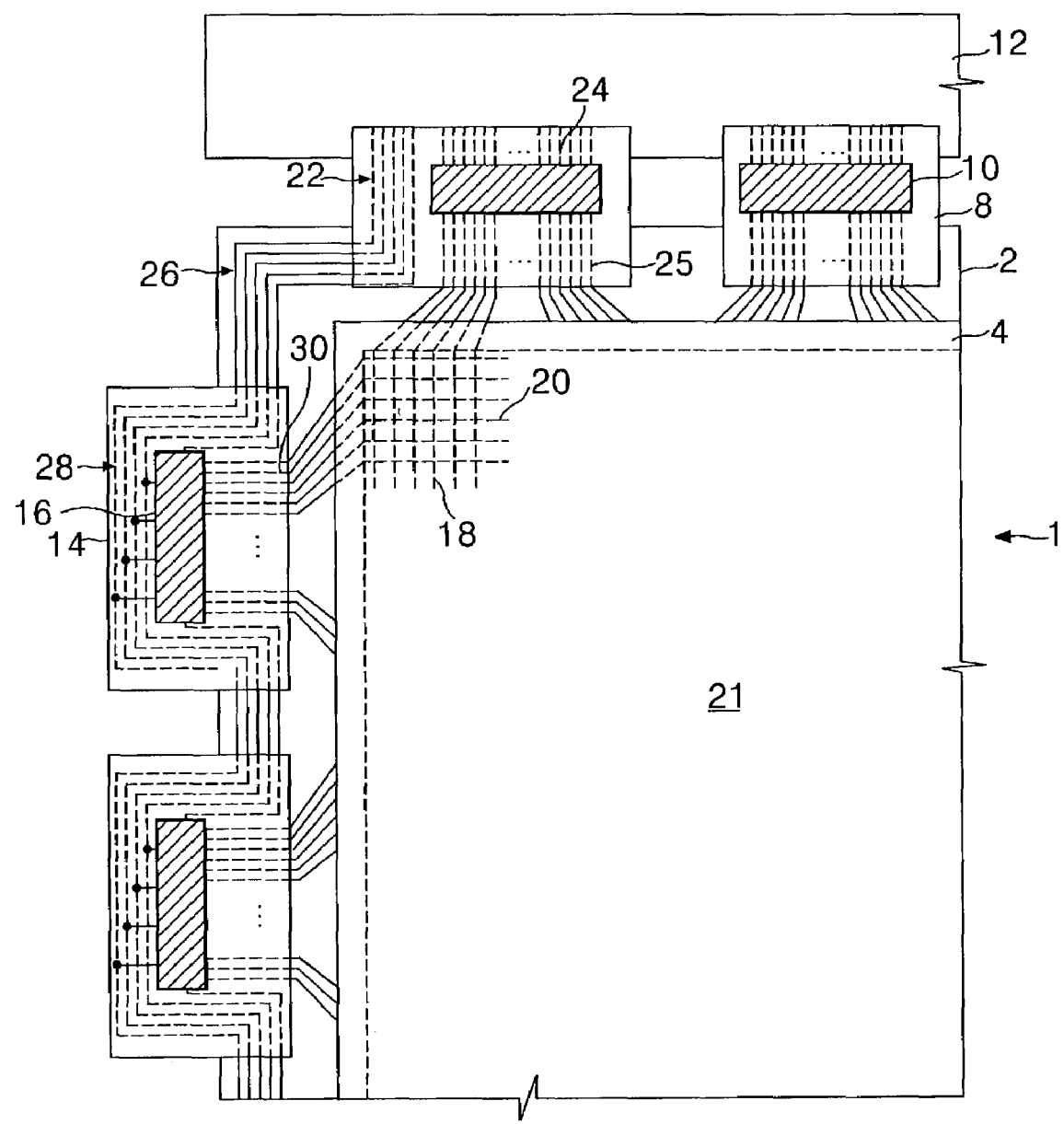
FIG. 1 illustrates a schematic view of a line-on-glass type liquid crystal display.
Figure 2:
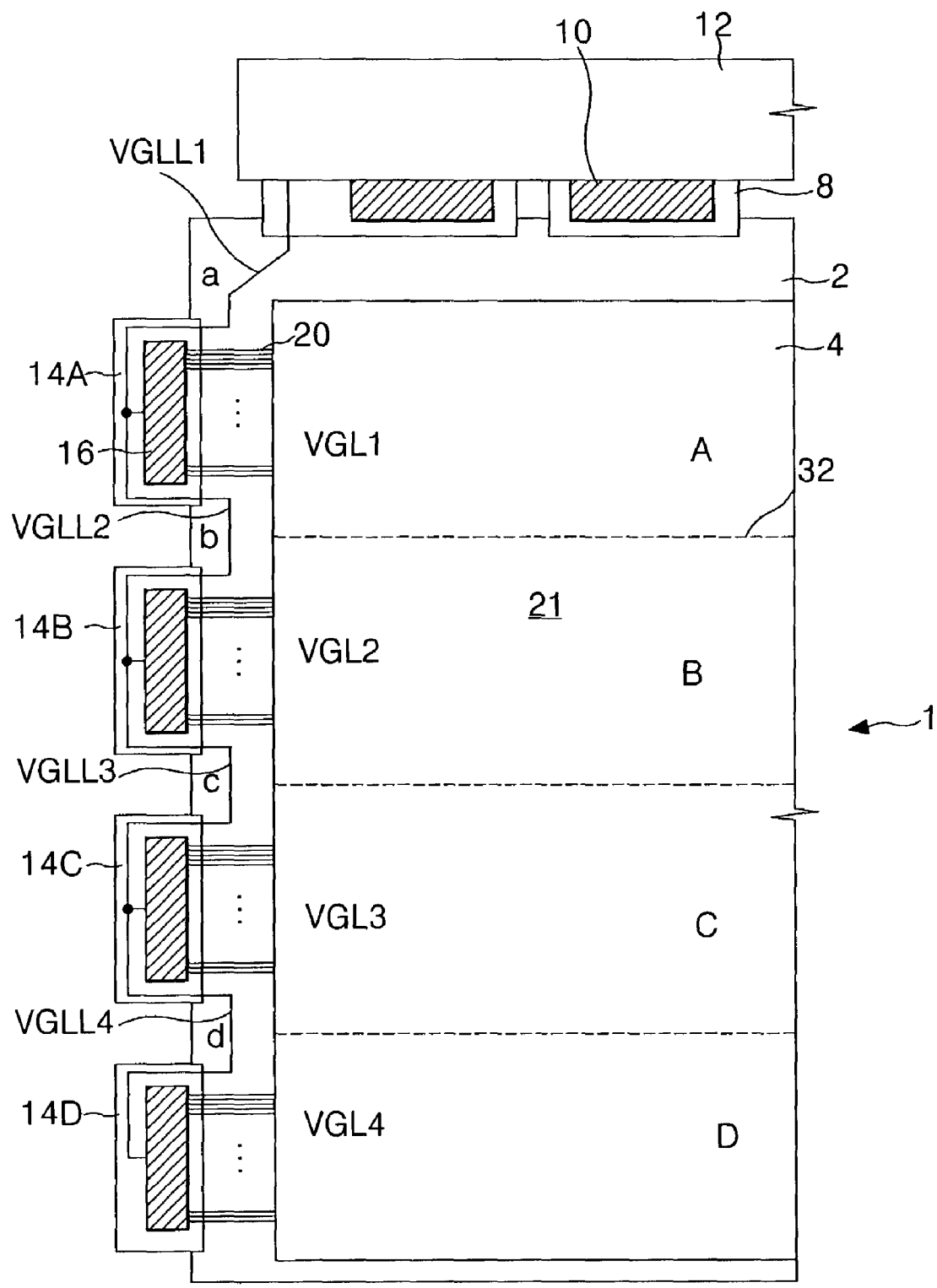
FIG. 2 illustrates a schematic view of a cross-line phenomenon between horizontal line blocks caused by differences in line resistances within the line-on-glass signal line group shown in FIG. 1.
Figure 3:
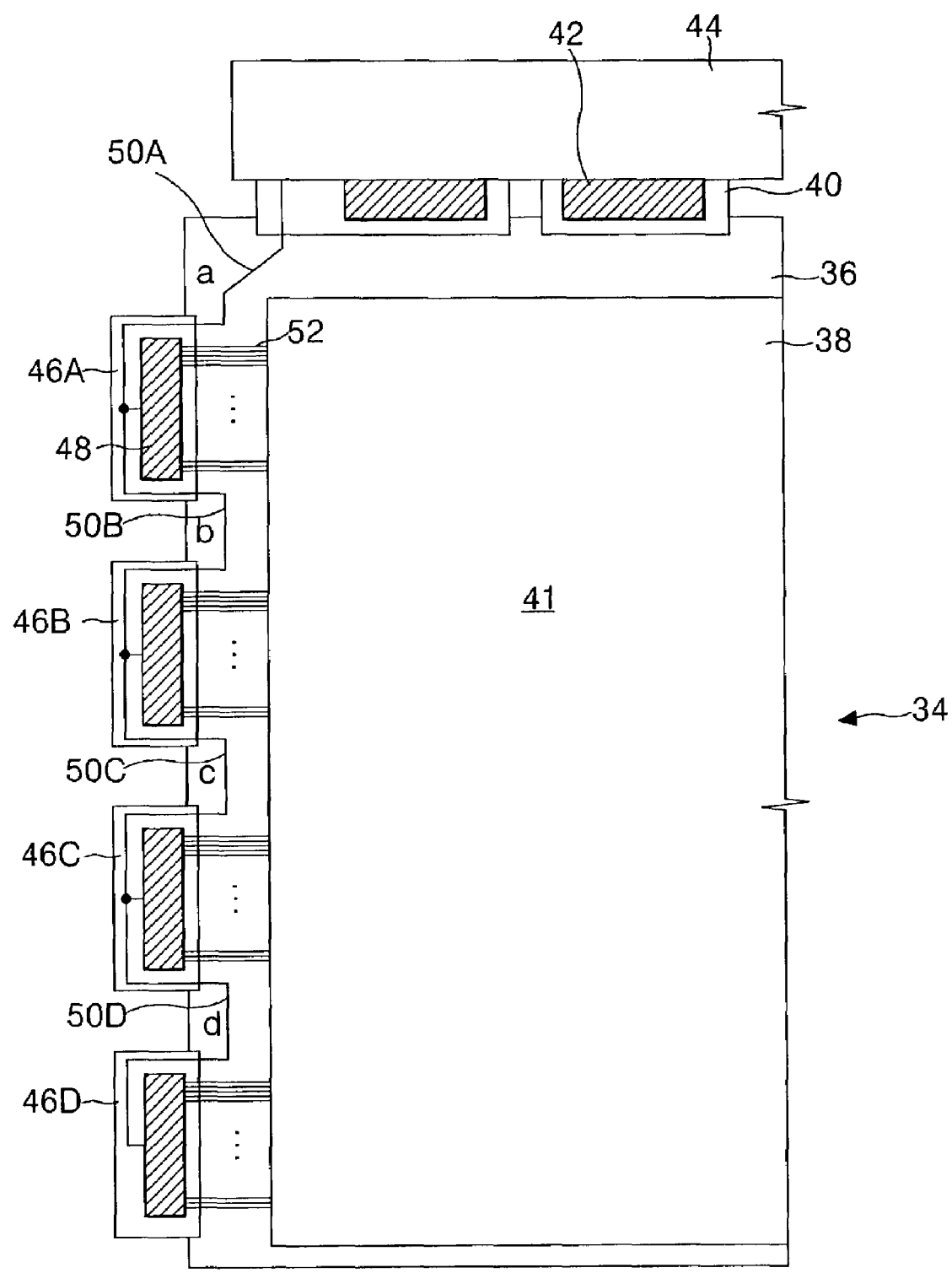
FIG. 3 illustrates a schematic view of a line-on-glass liquid crystal display according to one aspect of the present invention.

FIG. 3 illustrates a schematic view of a line-on-glass liquid crystal display according to one aspect of the present invention.

Referring to FIG. 3, the liquid crystal display according to the principles of the present invention may, for example, include a liquid crystal display panel 34, a plurality of data TCPs 40 connected between a first side of the liquid crystal display panel 34 and a data PCB 44, first to fourth gate TCPs 46A to 46D connected to a second side of the liquid crystal display panel 34, a plurality of data driver ICs 42 mounted on the data TCPs 40, and a plurality of gate driver ICs 48 mounted on the first to fourth gate TCPs 46A to 46D. The data driver ICs 42 convert digital pixel data signals into analog pixel voltage signals and apply the analog pixel voltage signals to data lines on the liquid crystal display panel. The liquid crystal display panel 34 may, for example, include a lower substrate 36 supporting signal lines and a thin film transistor array, an upper substrate 38 supporting a color filter array, and a layer of liquid crystal material injected between the lower and upper substrates 36 and 38, respectively. The liquid crystal display panel 34 may further include a picture display area 41 having a plurality of liquid crystal cells arranged where the gate lines 52 cross a plurality of data lines (not shown). Data pads and gate pads may be arranged at respective ends of the data and gate lines at an outer portion of the lower substrate 36, outside the picture display area 41. First to fourth LOG signal line groups 50A to 50D, for transmitting gate driving signals applied to the gate driver IC 48, may be arranged within the outer portion of the lower substrate 36.

Signals transmitted through each gate driver IC 48 may be subjected to a voltage drop caused by internal line resistances. To compensate for this voltage drop, gate high and low voltages (Vgh) and (Vgl), respectively, applied gate lines 52 may be increased by a predetermined amount. Accordingly, deleterious effects of differences in transmitted signal voltages between the gate driving ICs 48, caused by line resistance differences between first to fourth LOG signal line groups 50A to 50D connected in series to each other, may be minimized.

The first to fourth LOG signal line groups 50A to 50D may transmit direct current voltage signals (e.g., gate-high voltage (Vgh), gate low voltage (Vgl), common voltage (Vcom), ground voltage (GND), supply voltage (VCC) signals, etc.) generated by a power supply (not shown) and also transmit gate control signals (e.g., gate start pulse (GSP), gate shift clock (GSC), gate enable (GOE) signals, etc.) generated by a timing controller (not shown). First to fourth LOG signal line groups 50A to 50D may be formed from the same material as the gate lines 52 (e.g., metal). The first to fourth LOG signal line groups 50A to 50D have intrinsic line resistance values proportional to their lengths.

In one aspect of the present invention, the first to fourth LOG-type signal line groups 50A to 50D may connect the first data TCP 40 to the first to fourth gate TCPs 46A to 46D.

The first to fourth LOG signal line groups 50A to 50D have first to fourth line resistance values, a, b, c, and d, proportional to their individual lengths and may be connected to each other in series via the first to fourth gate TCPs 46A to 46D. In one aspect of the present invention, the second to fourth LOG signal line groups 50B to 50D may substantially equal in length. Individually, the second to fourth LOG signal line groups may therefore have substantially the same line resistance values (e.g., b=c=d). However, line resistance values b, c, and d have a cumulative effect on signals transmitted along the second to fourth LOG signal line groups 50B to 50D. Accordingly, the line resistance value of the LOG signal line group increases as its overall length increases.

The first data TCP 40 may, for example, include input and output pads for electrically connecting the data driver IC 42 mounted thereon to the data PCB 44. The input pads of the first data TCP 40 are electrically connected to the output pads of the data PCB 44 while the output pads of the first data TCP 40 electrically connect the data driver IC 42 to data pads of the lower substrate 36. In one aspect of the present invention, the first data TCP 40 may further include a gate driving signal transmission line group (not shown) for electrically connecting the first LOG signal line group 50A on the lower substrate 36 to the timing controller and power supply via the data PCB 44.

Mounted with gate driver ICs 48, the first to fourth gate TCPs 46A to 46D may be connected to gate pads of the lower substrate 36 via output pads of the gate driving IC 48. The first to fourth gate TCPs 46A to 46D may further include a gate driving signal transmission line group connecting the first to fourth LOG signal line groups 50A to 50D and gate driver ICs 48 on the lower substrate 36.

Each gate driver IC 48 may sequentially apply a scanning signal (e.g., a gate high voltage signal (Vgh)) to each of the gate lines in response to inputted control signals. Further, the gate driver ICs 48 may apply a gate low voltage signal (Vgl) to each of the gate lines when the gate high voltage signal (Vgh) is not applied. In one aspect of the present invention, consecutive gate driver ICs 48 apply a gate high and low voltage signals (Vgh) and (Vgl), respectively, reduced according to an internal resistance that increases by a predetermined amount such that substantially no deterioration in picture quality is generated. Accordingly, driving voltages applied to the last of consecutive gate lines within each of the gate driver ICs 48 substantially equal to driving voltages applied to the first of consecutive gate lines of each successive gate driver IC 48. As a result, voltage differences are not generated between the gate driver ICs 48 due to line resistance differences along the first to fourth LOG signal line groups 50A to 50D.

Figure 4:
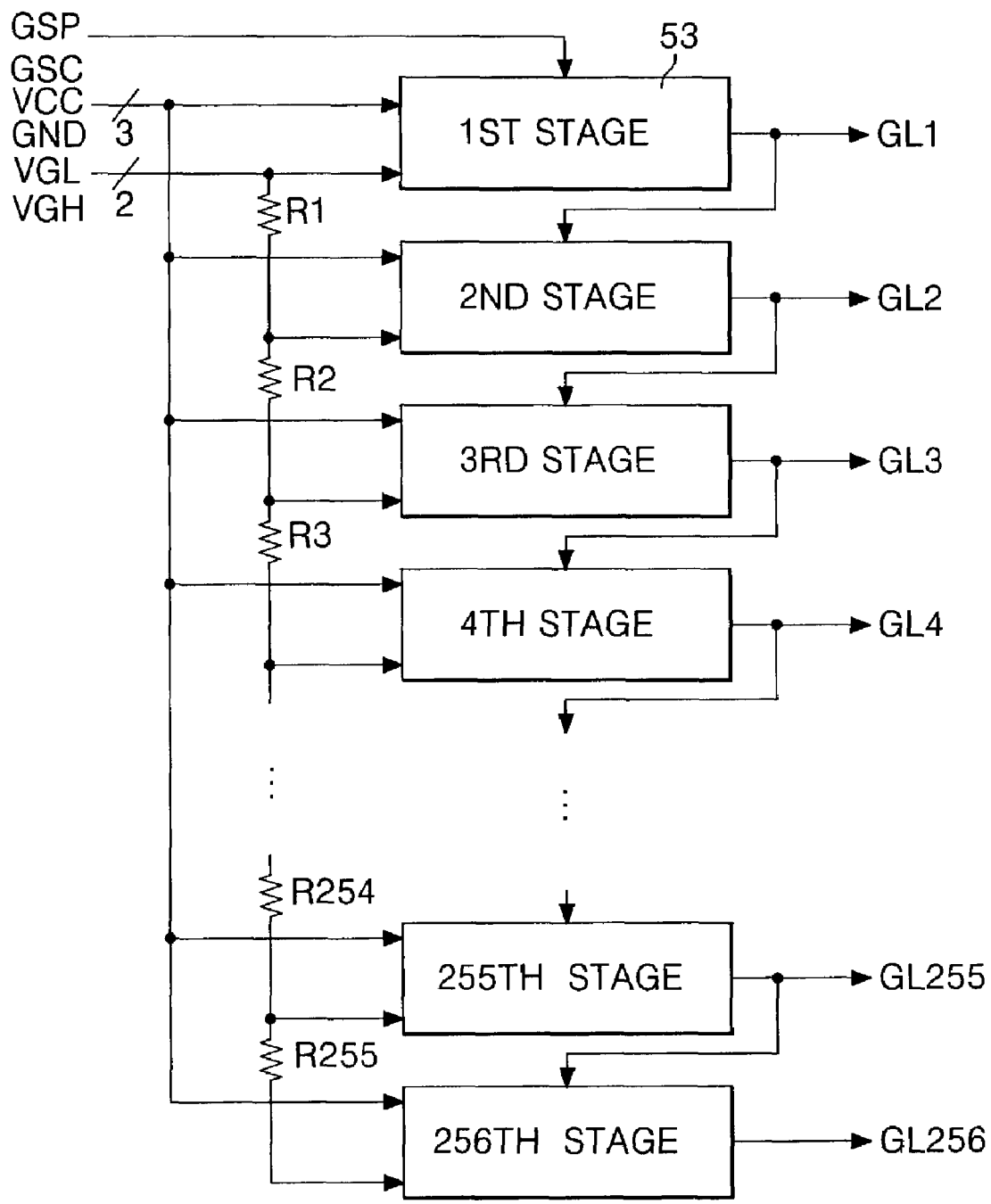
FIG. 4 illustrates a block circuit diagram of the gate driver ICs shown in FIG. 3, according to one aspect of the present invention.

According to the principles of the present invention, and referring to FIG. 4, a first gate driver IC 48 may, for example, include 1st to 256th stages 53 for sequentially driving the first 256 gate lines GL1 to GL256. Each of the 1st to 256th stages 53 may include a shift register for shifting and outputting a gate start pulse signal (GSP) generated by the timing controller in response to a gate shift clock signal (GSC), a level shifter for selectively outputting a gate high or gate low voltage in response to a shift signal outputted from the shift register, and an output buffer for buffering an output signal of the level shifter such that the output signal may be outputted to corresponding gate lines GL1 to GL256. Accordingly, the 1st to 256th stages 53 may be connected in cascade to a gate start pulse input line. The 1st to 256th stages 53 may further be commonly connected to gate shift clock (GSC), gate high voltage (VGH), gate low voltage (VGL), supply voltage (VCC), and ground voltage (GND) input lines.

In one aspect of the present invention, input lines may be coupled to the stages 53 such that gate high and low voltage signals (VGH) and (VGL), respectively, may be directly applied to each of the gate lines GL1 to GL256. Resistors R1 to R255, each having predetermined values, may be arranged between the 1st to 256th stages 53 such that an input line resistance incrementally increases by a predetermined amount in proportion to a line length of the input lines. Thus, gate high and low voltage signals (VGH) and (VGL), respectively, reduced in proportion to the first resistor R1 rather than the first gate line GL1, are applied to the second gate line GL2 via the 2nd stage 53. Similarly, gate high and low voltage signals (VGH) and (VGL), respectively, reduced in proportion to the first and second resistors R1+R2, are applied to the third gate line GL3 via the 3rd stage 53, and so on. Accordingly, gate high and low voltage signals (VGH) and (VGL), respectively, reduced in proportion to gate input line resistors R4-R255 connected to input terminals of the 1st to 256th stages 53, may be applied to the 4th to 256th gate lines GL4 to GL256. A line resistance of gate high and low voltage input lines (VGH) and (VGL), respectively, applied to the 256th stage 53 is reduced in proportion to the first through 256th resistors R1+R2+R3+ . . . +R254+R255 and is substantially equal to that of the second to fourth LOG signal line groups 50B to 50D connected between, for example, the first gate driver IC 48 and a successive gate driver IC 48. Accordingly, a line resistance R1+R2+R3+ . . . +R254+R255 of the gate high and low voltage input lines (VGH) and (VGL), respectively, connected to the input terminal of the 256th stage 53 is substantially equal to a line resistance of the gate high and low voltage input lines (VGH) and (VGL), respectively, connected to the first stage 53 of the successive gate driver ICs 48 via the second to fourth LOG signal line groups 50B to 50D.

By incrementally increasing the input line resistance of gate lines GL1 to GL256 such the input line resistance approaches the line resistance of the second to fourth LOG signal line groups 50B to 50D, then the picture quality of the liquid crystal display is not deteriorated.

For example, assuming that a line resistance of each of the second to fourth LOG signal line groups 50B to 50D connected between the first to fourth gate driver ICs 48 is about 10Ω, the input lines within the gate driver IC 48 may be designed such that the total line resistance R1+R2+R3+ . . . +R254+R255 of the gate high and low voltage input lines (VGH) and (VGL), respectively, is also about 10Ω. Since values of the 1st to 255th line resistors R1 to R255 within the gate driver IC 48 are constant, a resistance value of each of the 1st to 255th line resistors R1 to R255 may be about 10/256Ω. Accordingly, gate high and low voltages (VGH) and (VGL), reduced by a predetermined amount proportional to an input line resistor having a resistance value incrementally increased by 10/256Ω for each gate line G1 to G256, may be applied to the first to 256th gate lines connected to the first gate driver IC 48. As a result, gate high and low voltages (VGH) and (VGL), respectively, reduced by a predetermined amount proportional to a sum (e.g., a+10Ω) of a first line resistance value, a, of the first LOG signal line group 50A with an input line resistance value (10/256Ω*256=10)Ω, may be applied to the 256th gate line GL256 of the first gate driver IC 48. Further, gate high and low voltages (VGH) and (VGL), respectively, reduced by a predetermined amount proportional to a sum (e.g., a+10Ω) of line resistance values of the first and second LOG signal line groups 50A and 50B, are applied to the first gate line GL1 of the second driver IC 48. Thus, voltage differences resulting from differences in line resistance are not generated between the 256th gate line GL256 of the first gate driver IC 48 and the first gate line GL1 of the second gate driver IC 48. Resistance values of input lines applying the gate high and low voltages (VGH) and (VGL), respectively, to the 1st to 256th stages 53 within the second to fourth gate driver ICs 48 may be provided similarly as in the first gate driver IC 48 such that the resistance of successive input lines is increased by about 10/256Ω for each stage 53. Accordingly, differences in line resistance caused by the LOG signal line group are not generated between the last (e.g., the 256$^{th}$) gate line of one gate driver IC 48 and the first gate line GL1 of a successive gate driver IC 48.

According to the principles of the present invention, an input resistance value of the 1st to 256th stages 53 (e.g., an input resistance of the 1st to 256th gate lines GL1 to GL256) in each of the first to fourth gate driver ICs 48 may be incrementally increased by a predetermined amount such that a gate driving voltage difference is not generated between the second to fourth LOG signal line groups 50B and 50D and the cross-line phenomenon is minimized. As a result, an input resistance on the (256*4)=1024th gate line GL1024 (i.e., the first gate line GL1 of the fourth gate driver IC 48) may be increased by a predetermined amount such that a picture quality of the display is not deteriorated.

Figure 5:
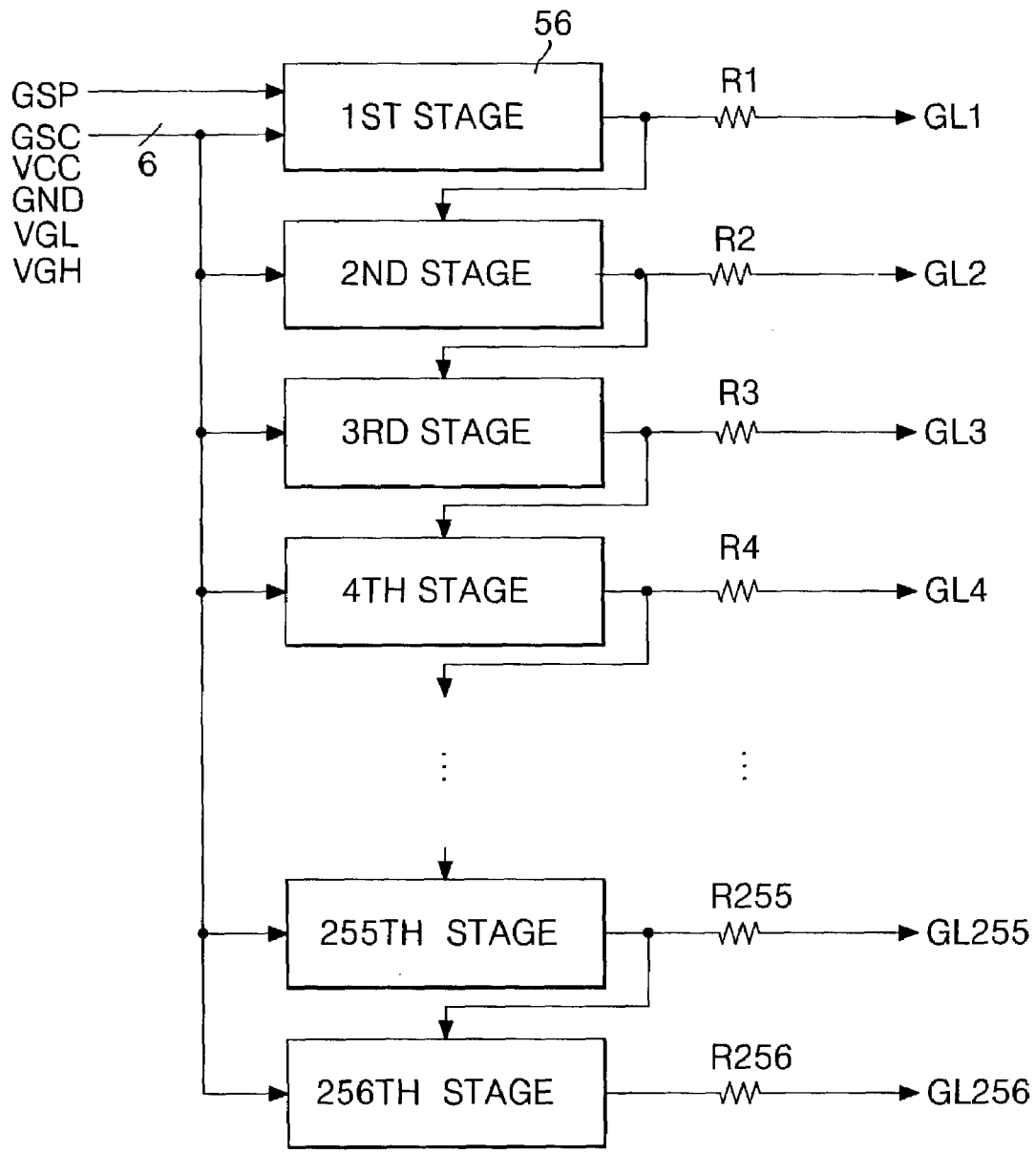
FIG. 5 illustrates a block circuit diagram of the gate driving IC shown in FIG. 3, according to another aspect of the present invention.

Referring to FIG. 5, in accordance with another aspect of the present invention, gate driver ICs 54 may be designed such that output lines connected to 1st to 256th gate lines GL1 to GL256 include output resistors R1 to R256, wherein a resistance value of each successive output resistor increases incrementally.

Accordingly, each gate driver IC 54 may include 1st to 256th stages 56 for sequentially driving 1st to 256th gate lines GL1 to GL256. In one aspect of the present invention, each of the 1st to 256th stages 56 may include a shift register for shifting and outputting a gate start pulse signal (GSP) generated by the timing controller in response to a gate shift clock signal (GSC), a level shifter for selectively outputting a gate high or gate low voltage in response to a shift signal outputted from the shift register, and an output buffer for buffering an output signal of the level shifter such that the output signal may be outputted to corresponding gate lines GL1 to GL256. Accordingly, the 1st to 256th stages 56 may be connected in cascade to a gate start pulse input line. The 1st to 256th stages 56 may further be commonly connected to gate shift clock (GSC), gate high voltage (VGH), gate low voltage (VGL), supply voltage (VCC), and ground voltage (GND) input lines.

In one aspect of the present invention, the output resistors R1 to R256 are arranged at each output line of the 1st to 256th stages 56 and have a resistance value incrementally increasing by a predetermined amount approaching the line resistance values b, c, and d of the second to fourth LOG-type signal line groups 50B to 50D. Thus, gate high and low voltages (VGH) and (VGL), reduced in proportion to the output resistors R1 to R256 of the 1st to 256th stages 56, are applied to the 1st to 256th gate lines GL1 to GL256.

In one aspect of the present invention, a resistance value of the output resistor R256 on the output line of the 256th stage 56 is substantially equal to the resistance values b, c, and d of each of the second to fourth LOG-type signal line groups 50B to 50D. Accordingly, the resistance value of output resistor R256, arranged on the output line of the 256th stage 56 of, for example, the first gate driver IC 54, may be substantially equal to a line resistance b+R1 of the output line on the first stage 56 of a successive gate driver IC 54. By incrementally increasing the input line resistance of the gate lines GL1 to GL256 within the gate driver IC 56 such that the resistance values approach the line resistance values of the second to fourth LOG signal line groups 50B to 50D, then the picture quality of the liquid crystal display is not deteriorated.

For example, assuming that a line resistance of each of the second to fourth LOG signal line groups 50B to 50D connected between the first to fourth gate driver ICs 54 is about 10Ω, the output resistors R1 to R256 of the gate driver IC 54 may be designed such that the total line resistance is also about 10Ω. Values of the output line resistors R1 to R256 in the gate driver IC 54 may be about 10*(line number/256)Ω. Accordingly, gate high and low voltages (VGH) and (VGL), respectively, reduced by a predetermined amount proportional to output resistors R1 to R256, are applied to the 1st to 256th gate lines G1 to G256 connected to the first gate driver IC 54. As a result, gate high and low voltages (VGH) and (VGL), respectively, reduced by a predetermined amount proportional to a sum (e.g., a+10Ω) of a first line resistance value, a, of the first LOG signal line group 50A with the 256th output line resistance value, are applied to the 256th gate line GL256 of the first gate driver IC 54. Further, gate high and low voltages (VGH) and (VGL), respectively, reduced by a predetermined amount proportional to a sum (e.g., a+10Ω) of line resistance values of the first and second LOG signal line groups 50A and 50B, are applied to the first gate line GL1 of the second drive IC 54. Thus, voltage differences resulting from differences in line resistance are not generated between the 256th gate line GL256 of the first gate driver IC 54 and the first gate line GL1 of the second gate driver IC 54. Output resistance values of the 1st to 256th stages 56 of the second to fourth gate driver ICs 54 may be provided similarly as in the first gate driver IC 54 such that the resistance of successive output lines is incrementally increased by a predetermined amount. Accordingly, differences in line resistance caused by the LOG signal line group are not generated between the 256th gate line G256 of one gate driver IC 54 and the first gate line GL1 of a successive gate driver IC 54.

According to the principles of the present invention, an output resistance value of the 1st to 256th stages 56 (e.g., an output resistance on the 1st to 256th gate lines GL1 to GL256) in each of the first to fourth gate driver ICs 54 may be incrementally increased by a predetermined amount such that gate driving voltage differences are not generated between the second to fourth LOG signal line groups 50B and 50D and the cross-line phenomenon is thereby minimized. As a result, an output resistance on the (256*4)=1024th gate line GL1024 (i.e., in the first gate line GL1 of the fourth gate driver IC 54) may be increased by a predetermined amount such that a picture quality of the liquid crystal display is not deteriorated.

According to the principles of the present invention, a line resistance of the gate lines in the gate driver ICs may be incrementally increased one gate line at a time such that differences in gate driving voltages caused by LOG signal line groups are not generated and a cross-line phenomenon may thereby be minimized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A line-on-glass liquid crystal display device, comprising:
    a picture display area having a plurality of liquid crystal cells arranged at crossings of a plurality of gate lines and a plurality of data lines;
    a plurality of gate driver integrated circuits for driving the gate lines mounted on a plurality of gate tape carrier packages, each of plurality of gate driver integrated circuits including a plurality of stages for sequentially driving the gate lines using a control signal generated by a timing controller, each of the plurality of consecutive stages being electrically connected to one of the plurality of gate lines;

a plurality of data driver integrated circuits for driving the data lines mounted on a plurality of data tape carrier packages; and a plurality of line-on-glass signal lines provided at an outer portion of the picture display area for applying driving signals to the gate driver integrated circuits, wherein each of plurality of gate driver integrated circuits includes a plurality of gate input line resistors each connected to one of the plurality of the stages, each of the plurality of gate input line resistors having a resistance value corresponding to the gate line it is connected to, wherein resistance values of successive gate input line resistors increases by a predetermined amount, the predetermined amount being selected such that an input line resistance value of the last gate line connected to each gate driver integrated circuit is substantially equal to an input line resistance value of the first gate line connected to a successive gate driver integrated circuit due to a line resistance of the line-on-glass signal line group between the gate driver integrated circuits.

2. The line-on-glass liquid crystal display device according to claim 1, wherein
the plurality of gate input line resistors are provided too at least one of a gate high voltage input line and a gate low voltage input line;
each gate input resister is connected between two adjacent stages for sequentially driving the gate lines within the plurality of gate driver integrated circuits; and
the resistance value of the plurality of gate input line resistors is incrementally increased by a predetermined amount for each stage.

3. The line-on-glass liquid crystal display device according to claim 1, wherein
each of the gate input line resistors is connected between a gate line and an output line of the plurality of stages for sequentially driving gate lines within the plurality of gate driver integrated circuits; and
the resistance value of the plurality of gate input line resistors is incrementally increased by a predetermined amount at each output line.

4. The line-on-glass liquid crystal display device according to claim 1, wherein each stage comprising:
a shift register for shifting and outputting a gate start pulse signal in response to a gate shift clock signal;
a level shifter for selectively outputting a gate high or gate low voltage in response to the shift signal outputted from the shift register; and
an output buffer for buffering an output signal of the level shifter and outputting the output signal to a corresponding gate line.

5. A liquid crystal display device, comprising:
a plurality of gate lines;
a plurality of driver integrated circuits connected to the plurality of gate lines; and
a plurality of consecutive stages for sequentially driving the gate lines using a control signal generated by a timing controller, each of the plurality of consecutive stages within each of the plurality of driver integrated circuits, each of the plurality of consecutive stages being electrically connected to one of the plurality of gate lines; and
a plurality of resistors each connected to one of the plurality of stages, wherein a line resistance of successive ones of the plurality of stages is incrementally increased by a predetermined amount, the predetermined amount being selected such that a line resistance at a last one of the consecutive stages within one of the plurality of driver integrated circuits is substantially equal to a line resistance at a first one of consecutive stages within a successive one of the plurality of driver integrated circuits due to a line resistance of a signal line group between the plurality of driver integrated circuits.

6. The liquid crystal display device according to claim 5, wherein the plurality of driver integrated circuits comprise gate driver integrated circuits.

7. The liquid crystal display device according to claim 5, further comprising:
at least one voltage input line commonly connected to the plurality of stages; and
a plurality of output lines each connected to one of the plurality of stages and a corresponding one of the plurality of gate lines.

8. The liquid crystal display device according to claim 7, further comprising a plurality of resistors each arranged between two adjacent stages of the plurality of stages, wherein a resistance value of successive ones of the plurality of resistors is incrementally increased by the predetermined amount.

9. The liquid crystal display device according to claim 7, further comprising a plurality of resistors each arranged between a gate line and one of the plurality of output lines of the plurality of stages, wherein a resistance value of successive ones of the plurality of resistors is incrementally increased by the predetermined amount.

10. The liquid crystal display device according to claim 5, wherein each stage comprising:
a shift register for shifting and outputting a gate start pulse signal in response to a gate shift clock signal;
a level shifter for selectively outputting a gate high or gate low voltage in response to the shift signal outputted from the shift register; and
an output buffer for buffering an output signal of the level shifter and outputting the output signal to a corresponding gate line.

11. A liquid crystal display, comprising:
a plurality of gate lines;
a plurality of driver integrated circuits connected to the plurality of gate lines;
a plurality of stages for sequentially driving the gate lines using a control signal generated by a timing controller within each of the plurality of driver integrated circuits, each of the plurality of stages being electrically connected to one of the plurality of gate lines; and
a plurality of line-on-glass signal lines for electrically connecting the plurality of driver integrated circuits to each other;
a plurality of resistors each connected to one of the plurality of stages, wherein a line resistance of successive ones of the plurality of stages is incrementally increased by a predetermined amount, the predetermined amount being selected such that a line resistance at a last one of consecutive stages within one of the plurality of driver integrated circuits is substantially equal to a line resistance of one of the plurality of line-on-glass signal lines between the one of the plurality of driver integrated circuits and a subsequent one of the plurality of driver integrated circuits.

12. The liquid crystal display according to claim 11, wherein the subsequent one of the plurality of driver integrated circuits is a successive one of the plurality of driver integrated circuits.

13. The liquid crystal display according to claim 11, further comprising:
   at least one voltage input line commonly connected to the plurality of stages; and
   a plurality of output lines each connected to one of the plurality of stages and a corresponding one of the plurality of gate lines.

14. The liquid crystal display according to claim 11, further comprising a plurality of resistors each arranged between two adjacent stages of the plurality of stages and at least one voltage input line, wherein a resistance value of successive ones of the plurality of resistors is incrementally increased by the predetermined amount.

15. The liquid crystal display according to claim 11, further comprising a plurality of resistors each arranged between a gate line and one of the plurality of output lines of the plurality of stages, wherein a resistance value of successive ones of the plurality of resistors is incrementally increased by the predetermined amount.

16. The liquid crystal display according to claim 11, wherein each stage comprising:
   a shift register for shifting and outputting a gate start pulse signal in response to a gate shift clock signal;
   a level shifter for selectively outputting a gate high or gate low voltage in response to the shift signal outputted from the shift register; and
   an output buffer for buffering an output signal of the level shifter and outputting the output signal to a corresponding gate line.

* * * * *